P. N. RAWSON.
VEHICLE CHASSIS.
APPLICATION FILED SEPT. 20, 1921.
1,437,911.
Patented Dec. 5, 1922.
3 SHEETS—SHEET 3.
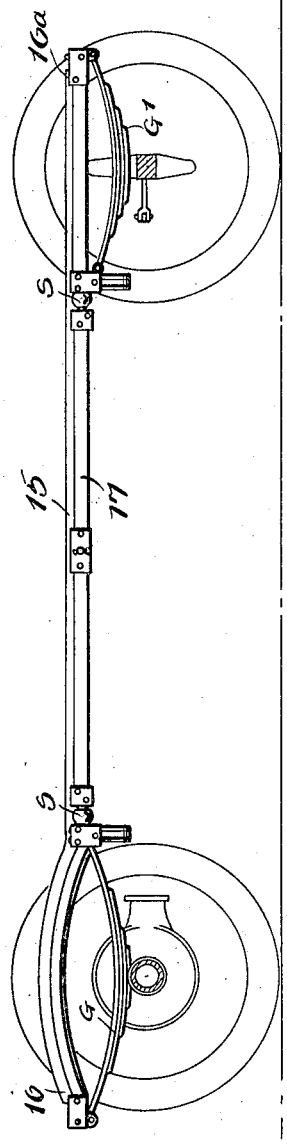
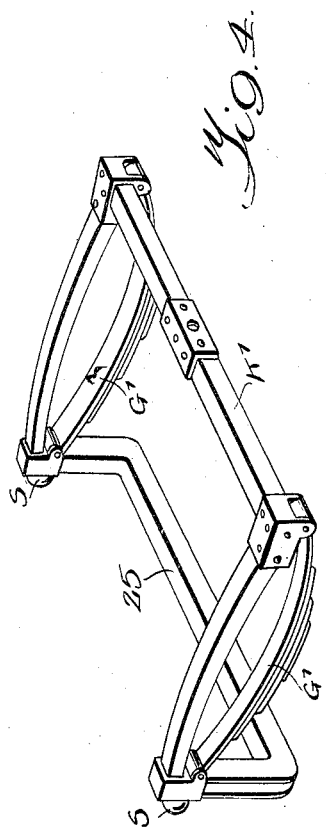
WITNESSES
George G. Myers
INVENTOR
P. N. Rawson,
BY
ATTORNEYS Patented Dec. 5, 1922.

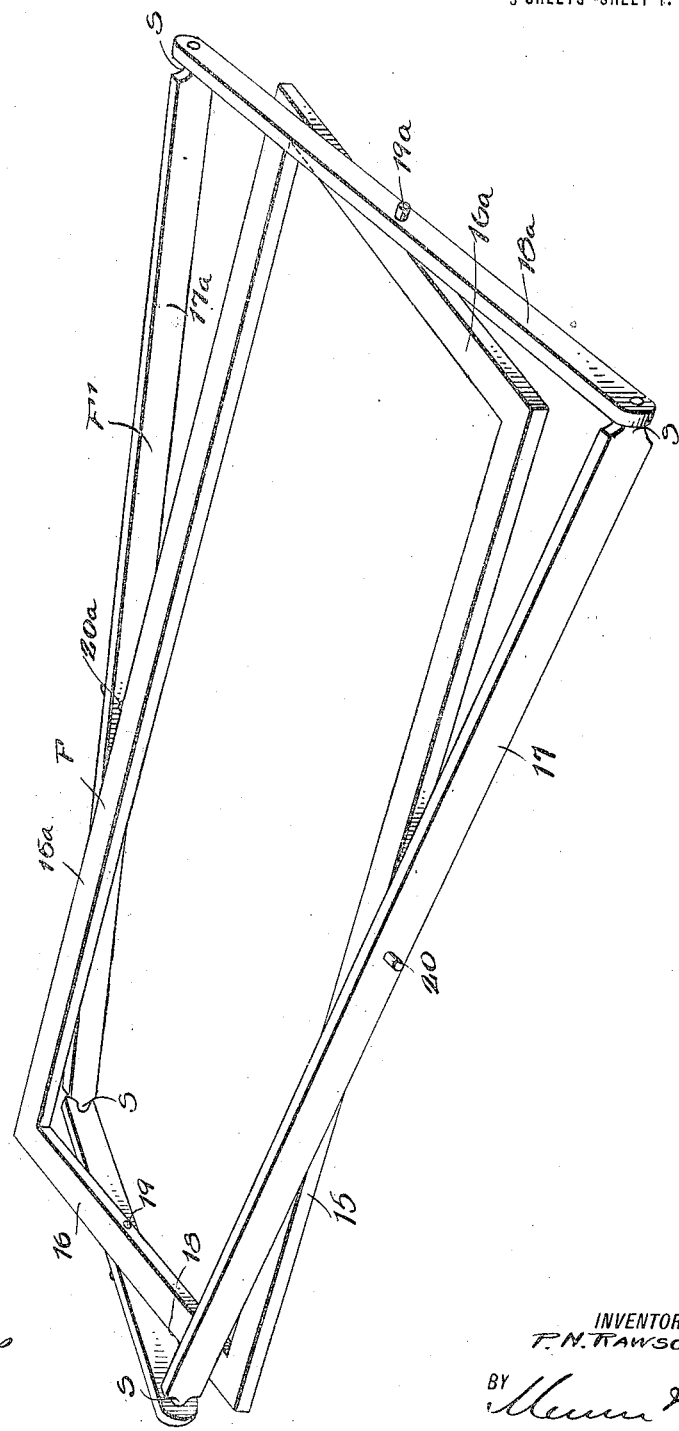

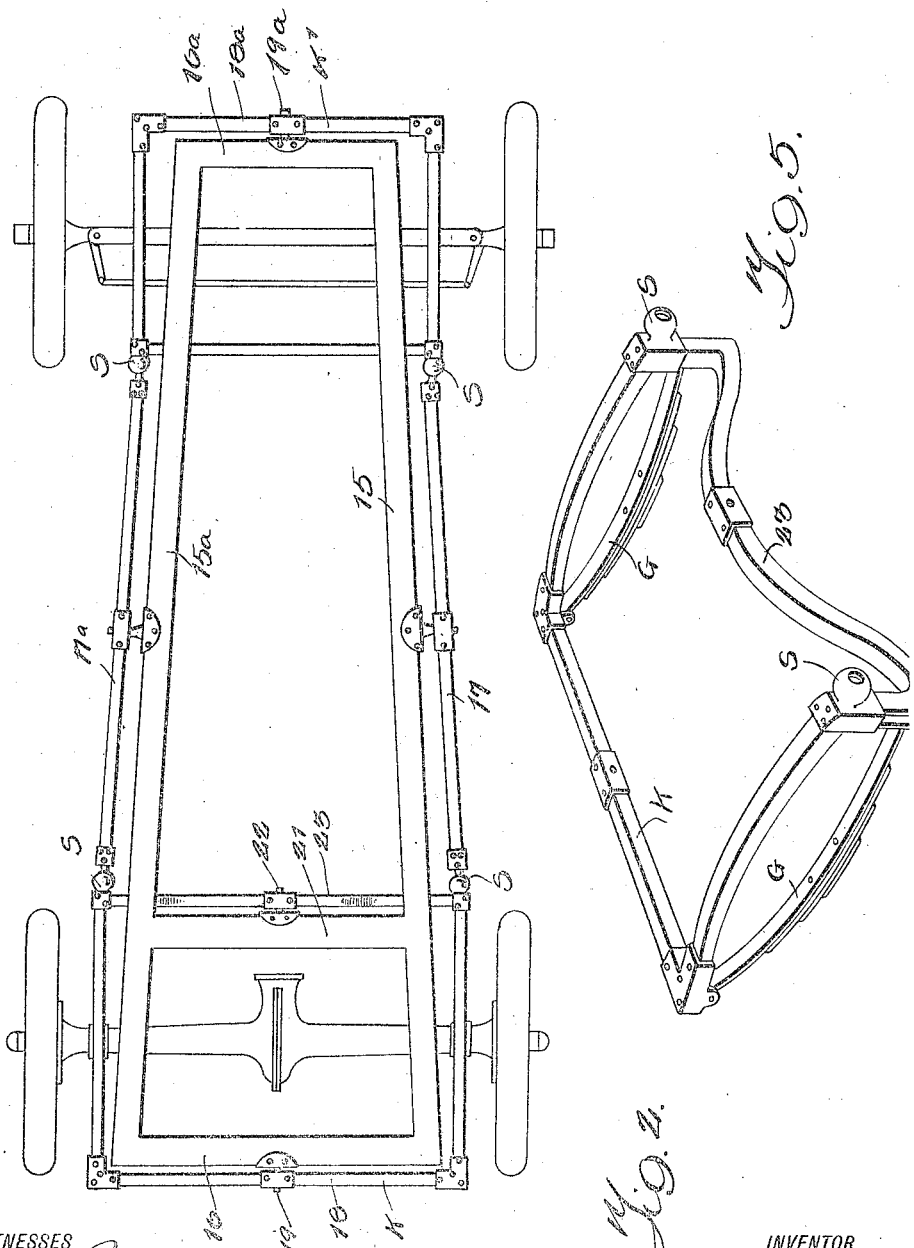

1,437,911

UNITED STATES PATENT OFFICE.

PHILIP NICHOLS RAWSON, OF GANANOQUE, ONTARIO, CANADA.

VEHICLE CHASSIS.

Application filed September 20, 1921. Serial No. 502,004.

*To all whom it may concern:*

Be it known that I, PHILIP NICHOLS RAWSON, a citizen of the United States, and a resident of Greyrock, Gananoque, in the Province of Ontario and Dominion of Canada, have invented certain new and useful Improvements in Vehicle Chassis, of which the following is a specification.

My invention relates to chassis for vehicles of any character, and a purpose of my invention is the provision of a chassis by means of which the transmission of all irregularities in the surface of a highway to the body of a vehicle is prevented and in such manner that the vehicle body or other parts of the vehicle usually carried by the chassis will be subjected to no tortional strains or stresses. Furthermore, my invention provides a chassis which will not rock under a shifting load, and which does not rely on springs for its flexibility.

I will describe one form of chassis illustrating the principle of my invention, and another form of chassis adapted for application to a motor vehicle, each embodying my invention, and will then point out the novel features thereof in claims.

In the accompanying drawings:

Figure 1 is a view showing in perspective a chassis illustrating the principle of my invention.

Figure 2 is a top plan view of a chassis as constructed for application to a motor vehicle, the same being in applied position upon the vehicle.

Figure 3 is a view of the chassis shown in Figure 2, in side elevation.

Figure 4 is an enlarged detail perspective view of the front frame of the chassis as shown in Figures 2 and 3.

Figure 5 is a view similar to Figure 4 showing the rear frame of the chassis shown in Figures 2 and 3.

Similar reference characters refer to similar parts in each of the several views.

Referring specifically to the drawings and particularly to Figure 1, my invention in its present embodiment comprises a main frame designated generally at F and a supplemental frame designated at F', the two frames approximating in shape a standard automobile chassis. The main frame F is made up of side members 15 and $15^a$ and end members 16 and $16^a$ rigidly connected to each other to provide a frame which is perfectly rigid, and upon which the vehicle body is adapted to be supported. The supplemental frame F' is made up of side members 17 and $17^a$ and end members 18 and $18^a$, with all of the members of a length exceeding the members of the main frame so that the supplemental frame surrounds the main frame. The side members 17 and $17^a$ are connected at their ends to the ends of the members 18 and $18^a$ by any form of joint capable of permitting universal movement of one member with respect to the other, I having shown in the present instance a pulley and socket connection designated in each instance at S. The end members 18 and $18^a$ are pivoted at points intermediate their ends on pivot pins 19 and $19^a$, respectively, fixed within end members 16 and $16^a$ at points intermediate the ends of the latter. The side members 17 and $17^a$ are likewise pivoted on pivot pins 20 and $20^a$, respectively, fixed within the side members 17 and $17^a$ at points intermediate the ends of the latter.

From the foregoing arrangement it will be seen that the frames F and F' are connected to each other by four pivots all lying within the same plane and supported, respectively, in the middle of the two end members and at or adjacent the middle of the two side members. These pivots have their axes parallel to the plane in which they lie, with each pair of pivots defining a straight line which intersects the line defined by the other pair of pivots at right angles. The pivot pins are all constructed to allow of a limited play in the direction of their axes for the purpose of permitting a limited lateral movement of the members comprising the supplemental frame with respect to the members comprising the main frame.

The supplemental frame is adapted to have attached thereto the running gear of a vehicle, and by virtue of its flexible construction and mounting with regard to the main frame F, it will be manifest that the running gear of the vehicle is capable of occupying any position under the action of the wheels traversing irregularities in a highway, and for maintaining the horizontal position of the main frame upon which the vehicle body is supported. By virtue of this arrangement a vehicle equipped with a chassis of this type can traverse the most uneven roads without subjecting the vehicle body or any other elements carried by the main frame to any strains or stresses, and without disturbing the horizontal position of the frame. This is of course rendered possible through the four pivots and the universal connections between the members comprising the supplemental frame. The supplemental frame not only prevents the rocking of the main frame under a shifting load, but secures the requisite flexibility of the chassis without the use of springs.

Referring now to Figures 2 and 3, I have here shown one practical application of the chassis embodying my invention to an automobile. In this form of my invention the main frame F is provided with a cross member 21, traversing the frame at a point adjacent its rear end in the manner clearly shown in Figure 2, the purpose of this member being to provide added rigidity to the frame and to form a support for an additional pivot pin 22 for the supplemental frame F'.

The supplemental frame F' in the present instance is constructed of side members 17 and 17ª, and end members 18 and 18ª, the latter, however, forming a part of spring supporting yokes K and K', respectively, upon which springs G and G' are supported. The yokes are connected to the side members 17 and 17ª by head and socket joints S, with the yoke K including a cross member 23 which is pivoted on the pin 22 mounted in the cross member 21. As clearly shown in Figure 5, the cross member 23 is bent longitudinally at its ends to dispose the medial portion of the member in the same plane as the cross member 21, while the opposite ends are bent upwardly so as to be disposed in substantially the same plane as the side members 15 and 15ª of the main frame F. By constructing a cross member in this manner the yoke K as an entirety is capable of rocking movement upon the pivots 22 and 19 so as to occupy any of the positions of which the end member 18 is capable of occupying.

As shown in Figure 4 the front yoke K' is provided with a cross member 25 which has its intermediate portion disposed in the plane below that of the main frame F, and its opposite ends bent upwardly so that their free ends normally occupy the same plane as the main frame. This arrangement likewise allows of the rocking movement of the yoke about the pivot 19ª, and without the yoke engaging the main frame.

As shown in Figures 1 and 2, the chassis just described is arranged so that the springs G and G' are disposed upon the front and rear axles of the automobile so that it may be said that the supplemental frame including the yokes K and K' are attached to the axles, but that the main frame is completely disconnected from the axles. This arrangement allows of the unrestricted movement of the supplemental frame with respect to the main frame so that when the axles are moved to different vertical or horizontal positions under the action of the wheels traversing the irregularities of a highway, the supplemental frame is free to conform to such movements without disturbing the position of the main frame. Thus the body of the automobile together with the motor and all other elements usually supported upon the chassis are caused to occupy their normal positions at all times and are thus prevented from being subjected to the usual strains and stresses occurring in vehicle chassis as heretofore constructed.

Although I have herein shown and described only two forms of chassis embodying my invention, it is to be understood that various changes and modifications may be made herein without departing from the spirit of the invention or the spirit and scope of the appended claims.

What I claim is:

1. A chassis for vehicles, comprising a rigid frame, a supplemental frame surrounding the rigid frame having a pivotal connection at each of its ends with the ends of the rigid frame and having a cross member disposed between its ends pivotally connected to a similar cross member of the rigid frame.

2. A chassis for vehicles, comprising a rigid frame adapted to support the body of the vehicle, a supplemental frame surrounding the rigid frame and adapted to be interposed between the body and the running gear of the vehicle, said supplemental frame having a pivotal connection at each of its ends and at each of its sides with the ends and sides of the rigid frame, and having a cross member occurring between its sides at a point adjacent the rear end thereof pivotally connected to a similar cross member extending between the sides of the rigid frame.

3. A chassis for a vehicle, comprising a rigid frame adapted to be secured to the body of a vehicle, a supplemental frame adapted to be interposed between the rigid frame and running gear of the vehicle, a pivot connection between the associated end members of said frames, a cross member for the rigid frame occurring adjacent its rear end, a cross member for the supplemental frame and extending parallel in close relation to the cross member of the rigid frame, and a pivot connection between said cross members occurring at a point centrally of the rigid frame.

4. A chassis for vehicles, comprising a rigid frame adapted to support the body of a vehicle, a supplemental frame surrounding the rigid frame and interposed between running gear and the rigid frame, a pivot connection between the associated end members of said frames, an intermediate section in each side member of the supplemental frame having its ends connected to the side frame members for universal movement, and a pivot connection between each of said sections and the associated side member of the rigid frame.

5. A chassis for vehicles, comprising a rigid frame adapted to support the body of a vehicle, a supplemental frame surrounding the rigid frame and interposed between running gear and the rigid frame, a pivot connection between the associated end members of said frames, an intermediate section in each side member of the supplemental frame having its ends connected to the side frame members for universal movement, a pivot connection between each of said sections and the associated side member of the rigid frame, a cross member extending between the rear end portions of the side members of the supplemental frame, a similar cross member extending between the side members of the rigid frame, and a pivot connection between said cross members.

PHILIP NICHOLS RAWSON.